Jan. 22, 1952 — C. A. ROYER — 2,583,306
WINDSHIELD VISOR
Filed April 21, 1950
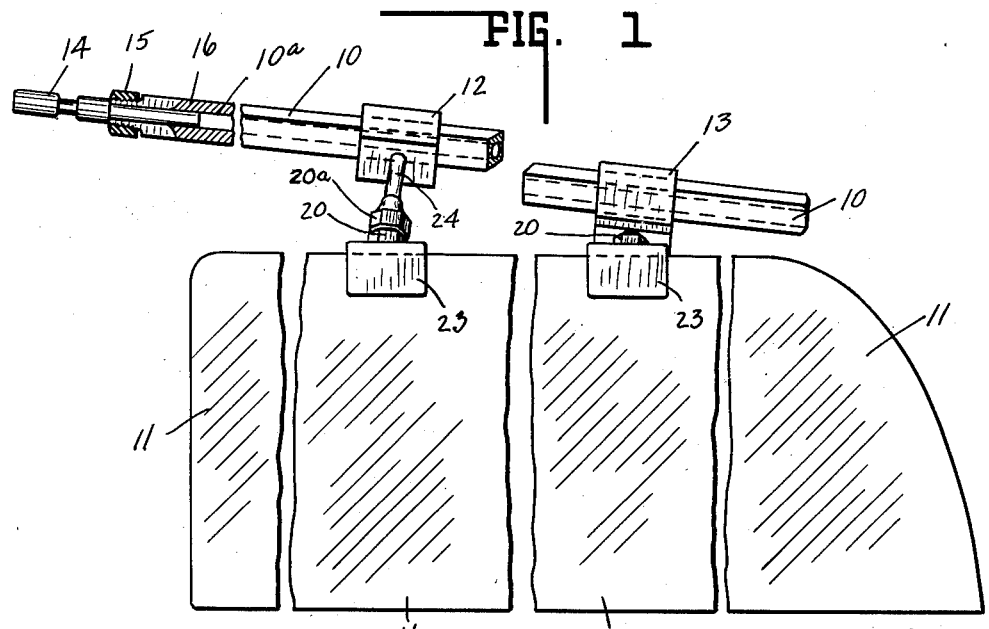
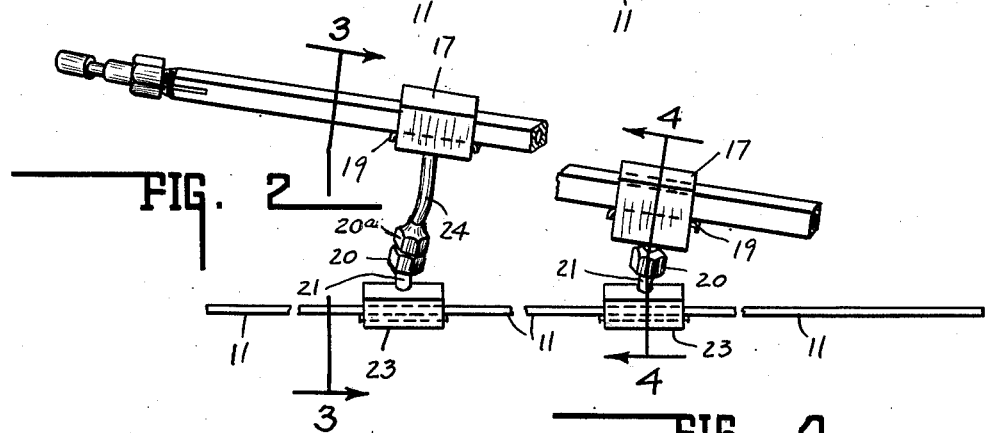
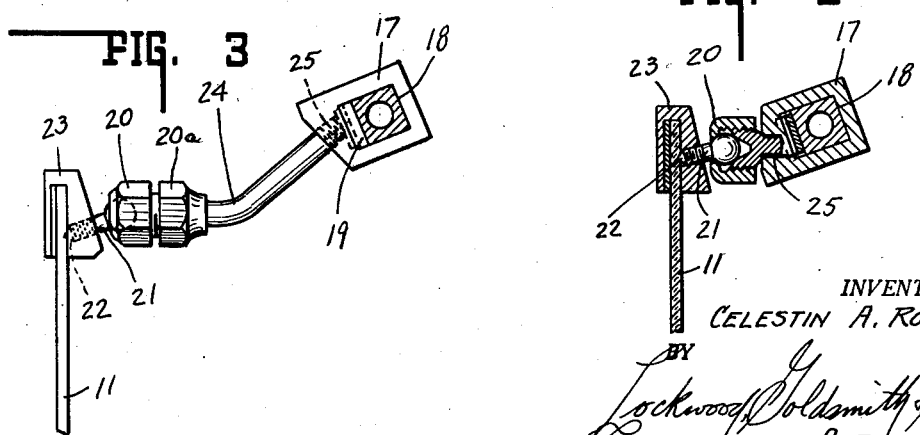
INVENTOR.
CELESTIN A. ROYER.
BY
Lockwood, Goldsmith & Galt.
ATTORNEYS.

Patented Jan. 22, 1952

2,583,306

UNITED STATES PATENT OFFICE 2,583,306

WINDSHIELD VISOR

Celestin A. Royer, Champaign, Ill.

Application April 21, 1950, Serial No. 157,370

2 Claims. (Cl. 296—97)

This invention relates to a windshield visor and the like.

The chief object of the present invention is to provide a simple, rugged windshield visor that can readily be attached to the majority of the popular make cars.

Another object of the present invention is to provide a transparent plastic body that may be cut to fit the exact shape of the top portion of the car windshield thus filtering out all of the sun rays coming through said windshield and when desired to serve as an anti-glare shield.

The chief feature of the present invention resides in an all purpose adapter unit which is secured to the conventional visor rod by a coupling nut.

Other objects and features of the invention will be set forth more fully hereinafter.

The full nature of the invention will be understood from the accompanying drawings and the following description and claims.

In the drawings, Fig. 1 is a front elevational view of the invention, parts being broken away and other parts being shown in section.

Fig. 2 is a top plan view.

Fig. 3 is a sectional view taken on line 3—3 of Fig. 2 and in the direction of the arrows.

Fig. 4 is a sectional view taken on line 4—4 of Fig. 2 and in the direction of the arrows.

In Fig. 1, 10 indicates a non-circular cross-sectioned rod or bar member which may be substantially hollow, see dotted opening 10b. A translucent anti-glare shield 11 of plastic plate material having the desired outline and thickness is adjustably secured to said rod by the connections generally indicated by numerals 12 and 13. An adaptor plug 14 is held in place by the friction nut 15 which is threaded on the split end 16 of the rod 10 as more clearly shown in Fig. 2. If rod 10 be solid it is socketed as at 10a.

Since the connectors 12 and 13 as shown in Figs. 2, 3 and 4 are substantially symmetrical except for a difference in the arm portions, a description of one will be understood to apply to the other. The bracket connection 17 having an interior surface 18 substantially conforms to the circumference of the said rod 10 and disposed therein is a friction locking spring 19. Said spring normally assumes an arcuate position with the ends thereof turned away from the rod thereby preventing the spring from sliding out of its proper position in said bracket.

A ball and socket structure 20 includes a ball which has a threaded shank 21 terminating in a cone point projection 22. This shank is threaded into a slot type socket 23 which slidably seats one edge of shield 11. The said cone point 22 pierces the shield 11 and thus holds it firmly in place in said socket.

The two connectors 12 and 13 differ in that connector 13 has a short and straight threaded arm 24 between the ball and socket joint and the bracket while the connector 12 has a long and slightly bent arm between the ball and socket and its associated bracket. Each arm is threaded into its bracket 17 as at 25. A friction nut 20a may be employed to aid in securing the threaded arm 24 to the ball and socket joint.

The present invention may be installed in the following manner: In a car having one type of present day sun visor, the visor is removed by unscrewing the sun visor friction screen and removing said visor. The adaptor is then fitted into the socket and clamped into place.

On other makes of cars where the visor is attached to a permanent rod, remove the visor by unscrewing the locking nuts and slide the visor off the rod. The friction nut is then backed off the split end of the present invention and the adaptor plug is removed. The square rod 11 is then slipped over the old visor rod and the friction nut is locked into place.

The present invention can be mounted on any model car and the flexible non-glare sun visor can be adjusted against or made to conform to windshields of any design or curvature.

While the invention has been illustrated and described in great detail in the drawings and foregoing description, the same is to be considered as illustrative and not restrictive in character.

The invention claimed is:

1. A windshield visor adapted to replace the standard car visor, comprising an adapter end unit, a rod of non-circular cross sectional area having a threaded end, a friction nut detachably securing said unit and rod end together, two rod enveloping brackets, a rod engaging spring clip in each bracket, two slot-type socket members, a ball and socket connection for each member, each said ball having a threaded shank scured to its respective member and terminating in a cone point projection, said projections being sized to extend into the slots of said members, an arm extending from the other end of each of said connections and secured to said respective brackets, the two arms being dissimilar in length, and a translucent anti glare shield adapted to be seated edgewise in said slots and secured therein by said projections.

2. A windshield visor as defined by claim 1 wherein the threaded end of the rod is tubular and split to nest the end of the unit.

CELESTIN A. ROYER.

REFERENCES CITED

The following references are of record in the file of this patent:

UNITED STATES PATENTS

| Number | Name | Date |
|---|---|---|
| 947,751 | Long et al. | Jan. 25, 1910 |
| 2,038,906 | Ruhland | Apr. 28, 1936 |
| 2,457,479 | Lipuma | Dec. 28, 1948 |

FOREIGN PATENTS

| Number | Country | Date |
|---|---|---|
| 148,045 | Austria | Dec. 10, 1936 |